United States Patent [19]
Woods et al.

[11] Patent Number: 5,901,445
[45] Date of Patent: May 11, 1999

[54] METHOD FOR MAKING A BUILDER'S TOOL

[75] Inventors: Richard S. Woods, Menomonee Falls; Randall J. Wright, Hartland, both of Wis.

[73] Assignee: Empire Level Mfg. Corp., Milwaukee, Wis.

[21] Appl. No.: 08/968,740

[22] Filed: Aug. 27, 1997

[51] Int. Cl.⁶ .................................................. B23P 13/00
[52] U.S. Cl. .......................... 29/896.6; 29/412; 29/558; 33/474; 33/476
[58] Field of Search ............................... 29/412, 417, 557, 29/558, 896.6; 33/429, 474, 476, 481, 482; 83/50, 55; 72/379.2

Primary Examiner—S. Thomas Hughes
Assistant Examiner—Jermie E. Cozart
Attorney, Agent, or Firm—Jansson, Shupe, Bridge & Munger, Ltd.

[57] ABSTRACT

A method for making a builder's tool such as a rafter square includes severing a segment from an elongate strip of material, forming a plurality of holes in the segment and marking the segment with dimensional indicia. The segment is then divided into two semi-finished components which are finish-machined to make two of the tools. In more specific aspects of the method, the forming step includes forming, in sequence, first and second sets of holes. The second set of holes includes a tool-receiving hole and the dividing step includes moving a cutting tool along the tool-receiving hole. Most preferably, the method is carried out using a press having a bed with first, second and third work stations, a movable platen carrying first and second hole-punching tools above the first and second work stations, respectively, and a marking tool above the third work station.

12 Claims, 5 Drawing Sheets

METHOD FOR MAKING A BUILDER'S TOOL

FIELD OF THE INVENTION

This invention relates to metalworking and, more particularly, to a method of mechanical manufacture involving multiperforated article-making and obtaining plural product pieces from a unitary work piece.

BACKGROUND OF THE INVENTION

Carpenters, masons and other persons in the building trades use a variety of tools in practicing their craft. For example, carpenters and masons use a tool known as a level to help assure that walls are vertical and that floors are horizontal. A leading manufacturer of high-quality builder's tools is Empire Level Mfg. Corp. of Milwaukee, Wis.

Another type of builder's tool is known as a rafter square. A rafter square is triangular in shape, has two edges at right angles to one another and has markings on it. Such markings are used by a carpenter in cutting lumber, e.g., roof joists and the like, to obtain a particular roof "pitch," e.g., 12 to 1, 10 to 1 or the like. (A roof having an exemplary 12 to 1 pitch has a vertical rise of 1 unit of measure, one inch for example, for each horizontal dimension (or "run") of 12 units of measure, e.g., twelve inches.

Rafter squares of known types are made by molding plastic or by die casting metal such as aluminum. While such rafter squares have been and are generally suitable for the intended purpose, they are not without disadvantages. Molded plastic rafter squares are not as durable as metal squares. And if the linear and angular dimensional markings are applied using paint or similar material, such markings are likely to wear off rather quickly.

Die cast rafter squares are inherently more durable than plastic squares but they have a disadvantage of their own. Die cast squares tend to be brittle and break easily. And making a die cast rafter square (or, for that matter, any die cast object) involves placing molten metal into a shaping die. Handling molten metal is attended by a certain level of danger not present with other manufacturing methods.

And die cast rafter squares are, in view of the invention, relatively expensive to make. Of course, a higher manufactured cost usually translates into a higher user purchase price.

A new method for making a builder's tool, e.g., a rafter square, which addresses problems and shortcomings of the prior art would be an important technical advance.

OBJECTS OF THE INVENTION

It is an object of the invention to provide a new method for making a builder's tool that overcomes problems and shortcomings of the prior art.

Another object of the invention is to provide a new method for making a builder's tool which is extremely durable.

Another object of the invention is to provide a new method for making a builder's tool, the dimensional indicia of which is permanent.

Still another object of the invention is to provide a new method for making a builder's tool which is tough and ductile (i.e., non-brittle) and, thus, resistive to fracture in use.

Another object of the invention is to provide a new method for making a high quality builder's tool.

Another object of the invention is to provide a new method for making a builder's tool which evidences certain manufacturing economies.

Yet another object of the invention is to provide a new method for making a builder's tool which uses metal at room temperature. How these and other objects are accomplished will become apparent from the following descriptions and from the drawings.

SUMMARY OF THE INVENTION

Briefly stated, the new method for making a builder's tool includes severing a relatively-short segment from an elongate strip of material which extends along a long axis. A preferred material is extruded aluminum. A plurality of holes is formed in the segment and, most preferably, holes are formed by forming, in sequence, first and second sets of holes. When the method is used to make a rafter square, at least one hole in each set is elongate with rounded ends and parallel side edges.

The segment is then marked with dimensional indicia. In a rafter square, such indicia will include lines and numerals representing angular units of measure and, probably, linear units of measure.

The segment is then divided into two semi-finished components. Such components are then finish-machined using a milling tool, thereby making two of the tools from a single segment. Finish-machining includes machining at least a part of the perimeter of each of the intermediate products. (When the starting material is a commercially-available elongate strip of extruded aluminum, the parallel strip edges are quite smooth and regular and entirely acceptable for a finished, ready-to-sell tool without further machining.)

In another aspect of the method, the second set of holes includes a tool-receiving hole and the dividing step includes moving a cutting tool, e.g.. a milling tool, along the tool-receiving hole and, particularly, along a linear hole axis. To divide a segment into two semi-finished components, the length of the tool-receiving hole is extended by milling away material at the hole ends until the hole "breaks out" and intersects the perimeter.

When making rafter squares, the tool-receiving hole is angled with respect to the long axis. A preferred included angle is 45°.

The segment severed from the elongates strip has a surface which may be used as a positional reference when carrying out the method steps. In a specific type of strip, the reference surface is one of the edges which is extrusion-formed when the strip is made. To help assure that the builder's tool is accurately formed and accurately marked, it is preferred that the segment reference surface be positioned with respect to a stationary reference. More specifically, where the segment reference surface is a straight edge, the segment is moved (by pneumatic "pushers" or the like) until the reference surface is in registry with an imaginary reference line that is stationary with respect to the bed of the press used to carry out the method. In one practical embodiment, the reference line is defined by the ends of two pushers.

In another aspect of the method, one of the above-described holes formed in the segment is identified as a first hole and the marking step is preceded by the step of inserting a first pair of locating pins into the first hole. Another one of the holes is a second hole and the inserting step includes inserting a second pair of locating pins into the second hole. Alignment of the segment reference surface with the reference line is thereby maintained.

The first pair of locating pins defines what is termed a first pin axis and the second pair of locating pins defines what is termed a second pin axis. The pin axes are spaced from the hole axis and in a more-specific embodiment, the pin axes are parallel to the hole axis.

In a highly preferred method, the severing, forming and marking steps are carried out on a press having a movable platen with appropriate punching and marking tools mounted on it. The dividing and finishing steps are carried out on a machining center, e.g., a computerized numerically controlled (CNC) milling center, away from the press.

The new method has yet other aspects. They include providing a press having a stationary bed with first, second and third work stations fixed with respect to the bed. The press also has a vertically-movable platen above the bed. Such platen includes (a) a first hole-punching tool above the first work station, (b) a second hole-punching tool above the second work station, and (c) a marking tool above the third work station.

A segment severed from the strip as described above, is provided at the first work station. A first intermediate product, i.e., a segment with a first set of holes formed in it, is provided at the second work station and a second intermediate product, i.e., a segment with both first and second sets of holes formed in it, is provided at the third work station.

The segment is impacted with the first hole-punching tool, thereby forming, at the first work station, another first intermediate product. The first intermediate product at the second work station is impacted with the second hole-punching tool, thereby forming, at the second work station, another second intermediate product. And the second intermediate product at the third work station is impacted with the marking tool, thereby forming a third intermediate product. Most preferably, the impacting steps are carried out simultaneously with a single stroke of the press platen.

Quantities of third intermediate products which have been sequentially formed as described above are moved in batches to a machining center away from the press. There follows the steps of dividing the third intermediate product into two semi-finished components and then finishing the components, thereby making two ready-to-sell tools. In a highly preferred method, several of the third intermediate products are mounted on a machining center table using appropriate clamps, locating pins and the like. When using a multi-head (e.g., four-head) CNC milling center, four of the third intermediate products may be finished with one "setup" to yield eight ready-to-sell tools.

Other details of the new method are set forth in the following detailed description and in the drawings.

DETAILED DESCRIPTION OF PREFERRED EMBODIMENTS

Figure 1:
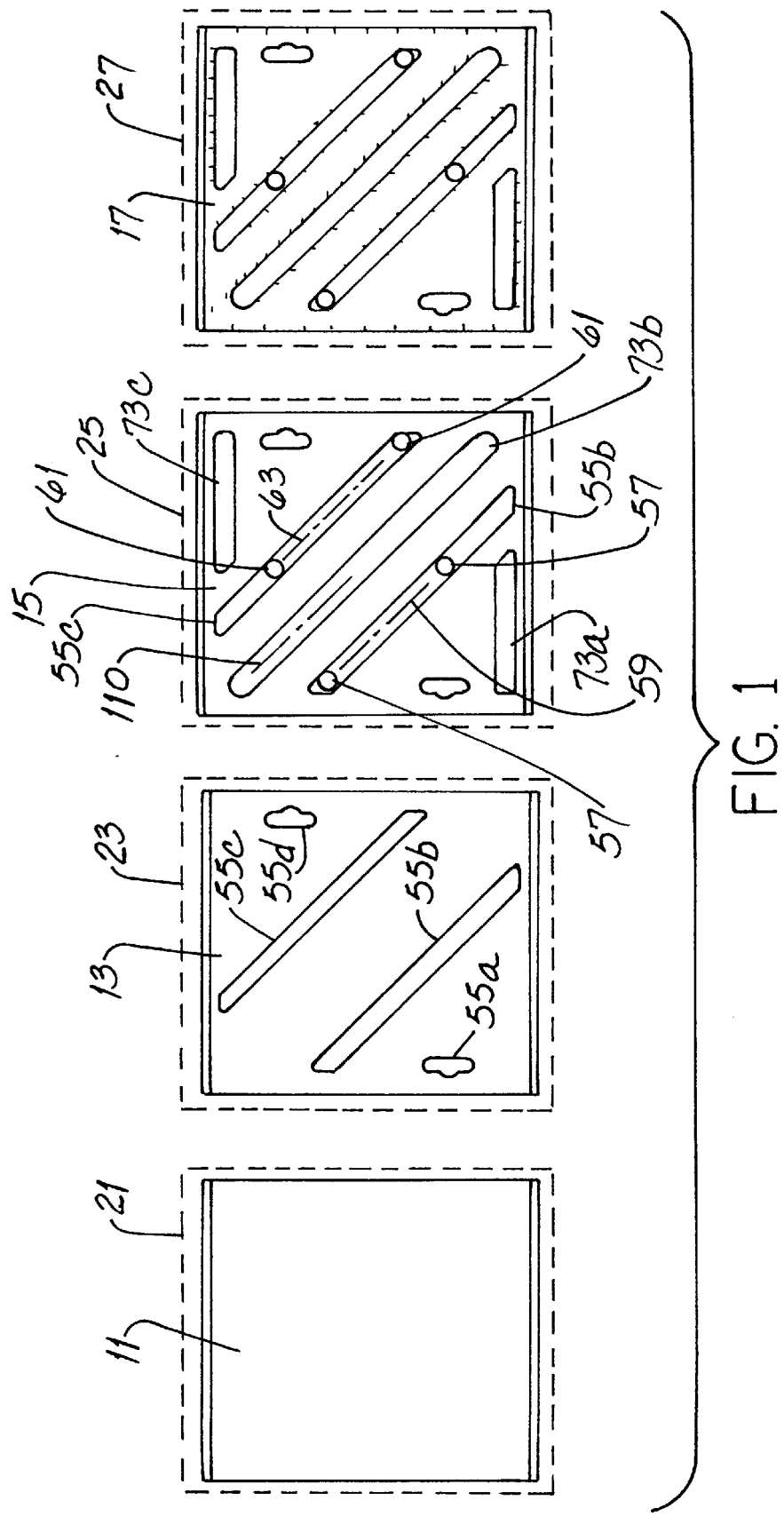
FIG. 1 is a top plan view of segment and intermediate product positions and configurations as they occur when practicing the preferred method.

Before describing the new method, it will be helpful to have an understanding of certain terminology used to in its description. Referring to FIGS. 1, 2, 3 and 7, FIG. 1 shows a segment 11 and intermediate products 13, 15, 17 in the same order (left to right) as the segment 11 and products 13, 15, 17 move through and occur in the press 19 used to make the builder's tool 10 which in the described example is embodied as a rafter square 10a.

Figure 2:
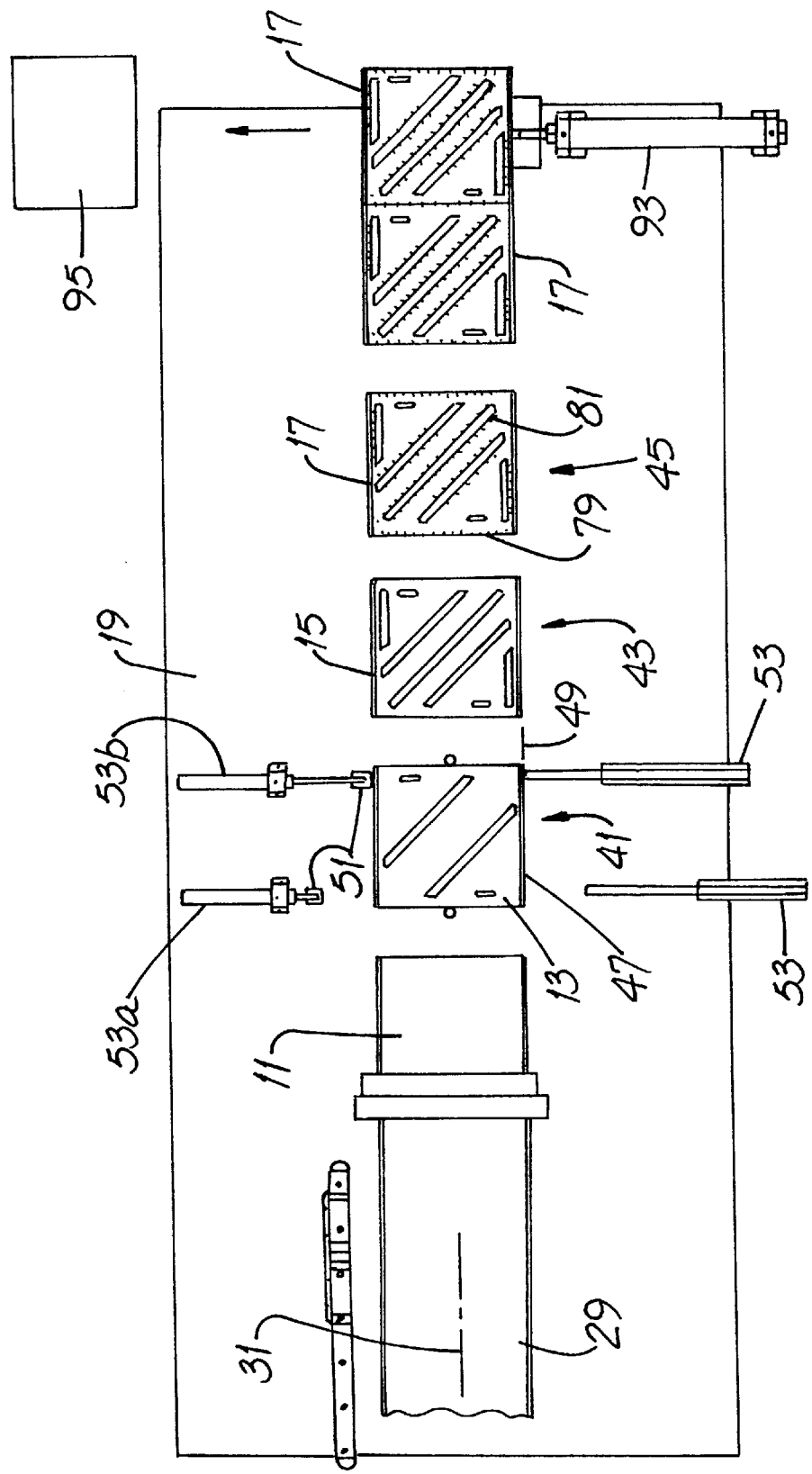
FIG. 2 is a top plan view of starting strip, segment and intermediate product positions and configurations shown in conjunction with a press used to practice the method. The press movable platen is omitted and other parts are broken away.
Figure 3:
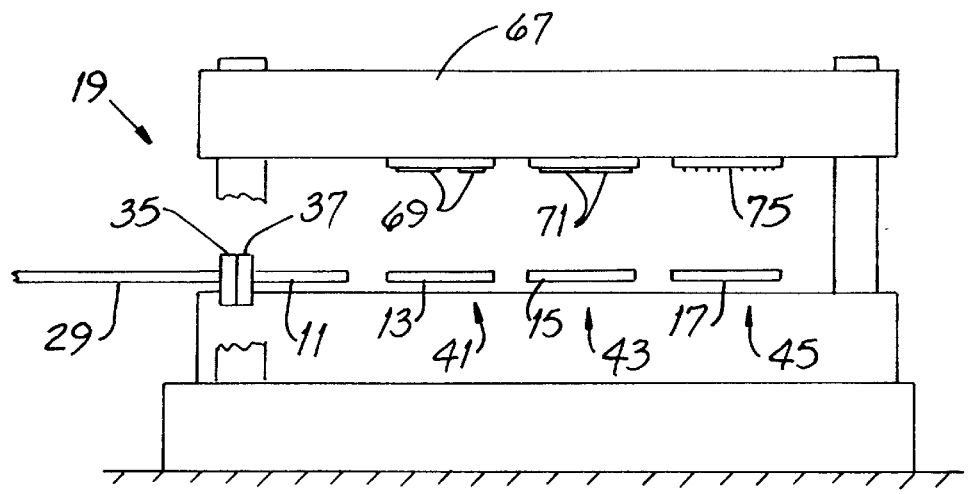
FIG. 3 is side elevation view generally representing the starting strip, segment and intermediate product positions of FIG. 2 and shown in conjunction with the press used to practice the method. Parts are broken away.
Figure 8:
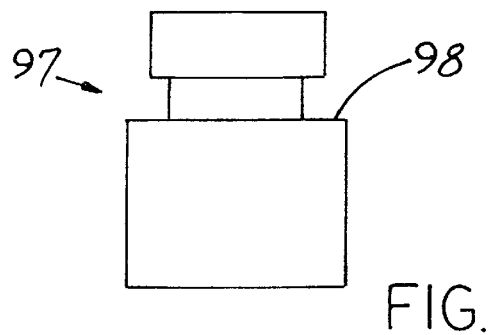
FIG. 8 is representative elevation view of a machining center.

Considered in one way, FIG. 1 depicts, in time sequence, the different positions and configurations of a single segment 11 as it moves through the exemplary press 19 shown in FIGS. 2 and 3. Considered in another way, FIG. 1 depicts, at some instant of time, the positions and configurations of four different segments in the press as such segments 11 move from the first position 21 and are successively transformed into intermediate products 13, 15 and 17. In this specification, the segment 11 at the second position 23 is identified as a first intermediate product 13, the segment at the third position 25 is identified as a second intermediate product 15 and the segment 11 at the fourth position 27 is identified as a third intermediate product 17.

Figure 4:
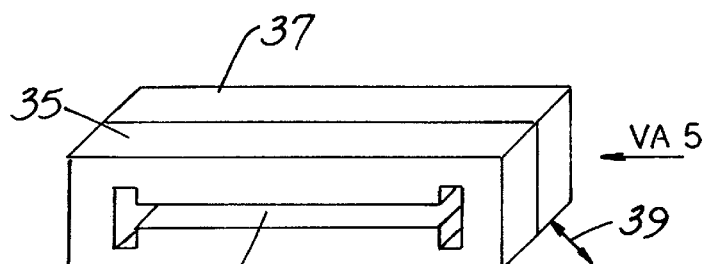
FIG. 4 is perspective view of a pair of shear blocks used to sever segments from an elongate strip.
Figure 5:
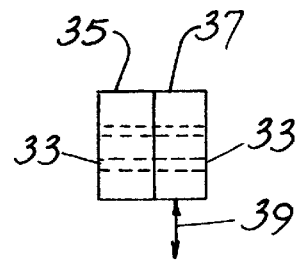
FIG. 5 is an end elevation view of the shear blocks of FIG. 4 taken along the viewing axis VA5 thereof.

In a highly preferred method, an elongate strip 29 of material, e.g., extruded aluminum, extends along a long axis 31 and is fed into the press 19 so that a relatively-short segment 11 may be severed from such strip 29. Referring particularly to FIGS. 3, 4 and 5, an end of the strip 29 is fed into the openings 33 in a pair of abutting shear blocks 35, 37. The openings 33 are in registry with one another, are shaped like the cross-sectional shape of the strip 29, shown in FIG. 6, and are substantially identically sized to permit the strip 29 to be inserted through such openings 33 with very slight clearance.

Segment severing is by holding the block 35 stationary and moving the block 37 angularly downwardly as represented by the arrows 39. The segment 11 is thereby cleanly severed from the strip 29 and results in an edge that requires only modest "cleanup" machining before the tool 10 is ready to sell. After the segment 11 is severed, the block 37 (with the segment still in the opening 35) returns to it starting position shown in FIGS. 3, 4 and 5 to be aligned with the elevation of the work stations 41, 43, 45 and the segment 11 is moved to the first work station 41. Conveniently, movement of the segment 11 and of the intermediate products 13, 15, 17 is by "grippers," e.g., mechanical or pneumatic, of a known type (not shown). Or movement may be by other mechanical means or by hand.

Figure 6:
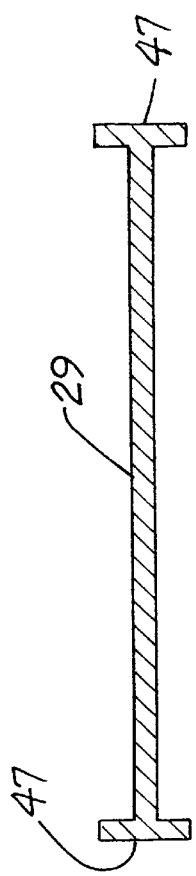
FIG. 6 is a cross-sectional view of the strip shown in FIGS. 2 and 3.

Referring particularly to FIGS. 2 and 6, the segment 11 has a surface 47, e.g., a straight, vertical edge, which may be used as a reference surface 47. In a specific type of strip 29, the reference surface 47 is one of the edges of the extrusion-formed strip 29 used in the method. To help assure that the builder's tool 10 is accurately formed and accurately marked, it is preferred that the segment reference surface 47 be positioned (both linearly and rotationally) in a horizontal plane and with respect to a stationary reference. The segment 11 is moved (by pneumatic "pushers" or the like) until the reference surface 47 is in registry with a stationary, reference line 49. In one practical embodiment, the reference line 49 is defined by the ends 51 of two side-by-side pushers 53a, 53b mounted on the press 19. Such pushers 53 hold the segment 11 in position until the holes (55a–55d) comprising the first set of holes is formed and locating pins inserted therein as described below.

Referring particular to FIGS. 1, 2, 3 and 7, the press platen 67 has mounted thereon first hole-punching tools 69 for forming the holes (55a–55d) comprising the first set of holes, second hole-punching tools 71 for forming the holes (73a–73c) comprising the second set of holes and a marking tool 75 for marking the dimensional indicia 79, 81 all as described below. Another marking tool 75 (not shown) is beneath the intermediate product 17 so that both sides of such product 17 are simultaneously marked with a single stroke of the platen 67. The tools 69 are above and in registry with the first work station 41, the tools 71 are above and in registry with the second work station 43 and the marking tools 75 are above, below and in registry with the third work station 45.

The preceding and following portions of the specification describe segment severing, hole formation and marking of dimensional indicia. While such severing, hole formation and marking could be carried out in sequence with respect to a particular, single segment 11, it is preferred that such operations be carried out simultaneously with respect to several segments 11 that "index" or move through the press 19.

As shown in FIG. 1, the holes 55a–55d comprising a first set of holes, are formed in first intermediate product 13. Such holes 55a–55d are elongate with generally-rounded ends and parallel side edges and are formed by the first punching tools 69 noted above. One of the holes 55a–55d, e.g., the hole 55b, is further identified as a first hole and a first pair of locating pins 57 is inserted into such hole 55b and define a first pin axis 59.

The hole 55c is further identified as a second hole into which is inserted a second pair of locating pins 61 which define a second pin axis 63. Each pin 57, 61 bears against the edges of the respective hole 55b, 55c into which it is inserted. And one each of the pins 57, 61 are at the respective ends of holes 55b, 55c. For subsequent steps carried out in the press 19, alignment of the segment reference surface 47 with the reference line 49 is maintained. That is, the pushers 53a, 53b need not thereafter be relied upon to maintain segment alignment with the line 49.

It is to be appreciated that while elongate holes 55b, 55c are shown, other hole shapes can be used with equal success. And a pair of holes could be used for the first pair of locating pins 57. The point is that hole selection should permit maintenance of segment alignment.

Referring to FIGS. 1, 2 and 3, the holes 73a–73c comprising a second set of holes are formed in second intermediate product 15, using the second hole-punching tools 71 noted above. Such holes 73a–73c are also elongate with generally-rounded ends and parallel side edges. The hole 73b extends along a hole axis 110 and the pin axes 59, 63 are spaced from such hole axis 110. In a more-specific embodiment, the pin axes 59, 63 are parallel to the hole axis 110.

Figure 7:
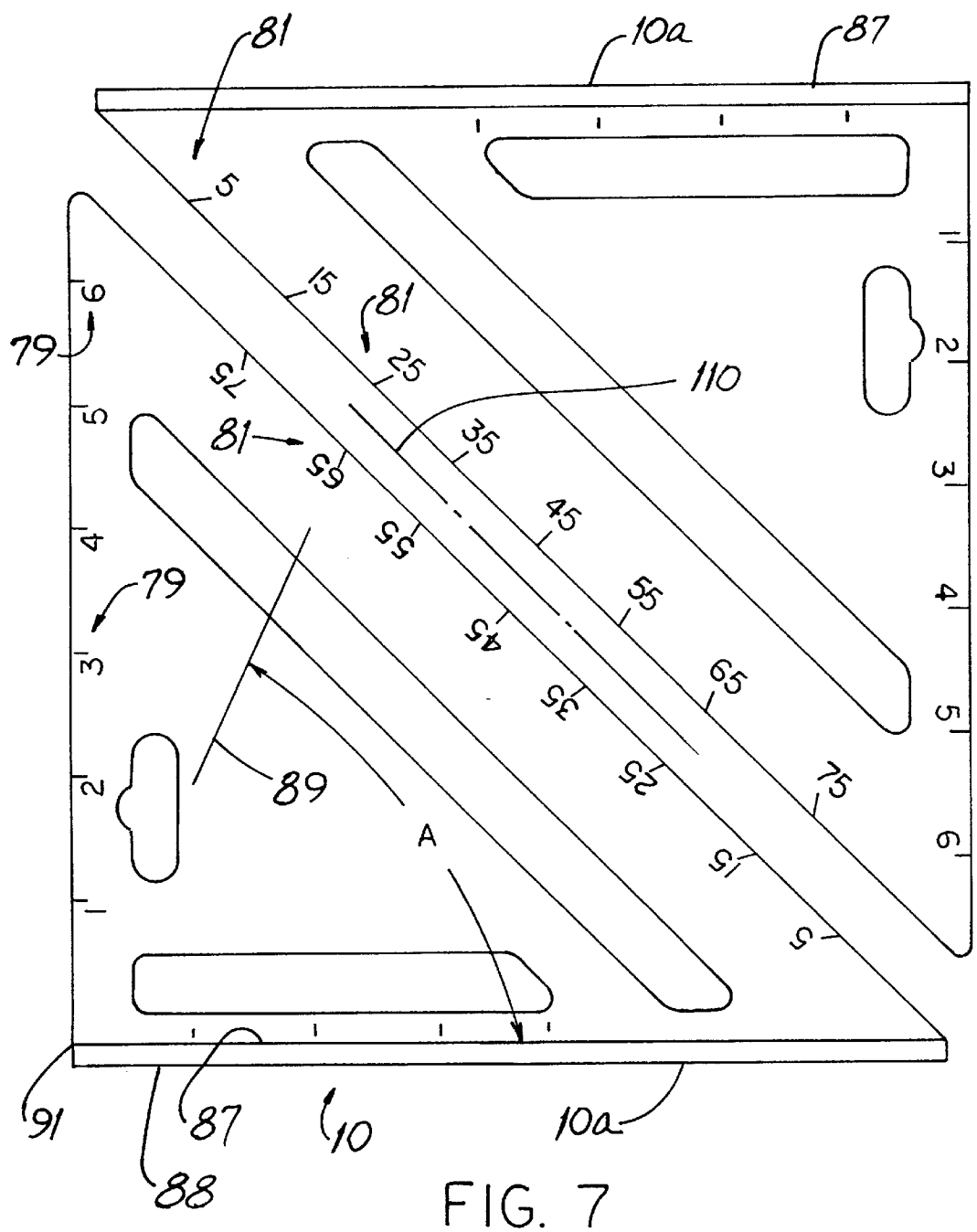
FIG. 7 is a top plan view of two exemplary rafter squares, a type of builder's tool, made using the method.

Referring next to FIGS. 2 and 7, third intermediate product 17 marked with dimensional indicia 79, 81. In a rafter square 10a, the indicia 81 include lines and numerals representing angular units of measure. In the exemplary embodiment, each indicium 81 represents the included angle A between the edge 87 and a radial 89 extending between the related indicium 81 and the apex 91. Most preferably, the tool 10 also has indicia 79 representing linear units of measure, e.g., inches in the depiction of FIG. 7.

Referring next to FIGS. 1, 2, 3 and 8, after dimensional marking, a third intermediate product 17 is moved to an ejection station equipped with a ram 93. Such ram 93 laterally urges the product 17 off of the press 19 and into a waiting receptacle 95. Batches of such product 17 are then carried to a machining center 97, e.g., a computerized numerically controlled (CNC) milling center, away from the press 19.

Of course, those of ordinary skill will appreciate that other transfer mechanisms and procedures may be used. For example, the products 17 could be transferred continuously (rather than in batches) directly to a closely-proximate machining center 97. And such products 17 could be transferred by hand, for example.

Figure 9:
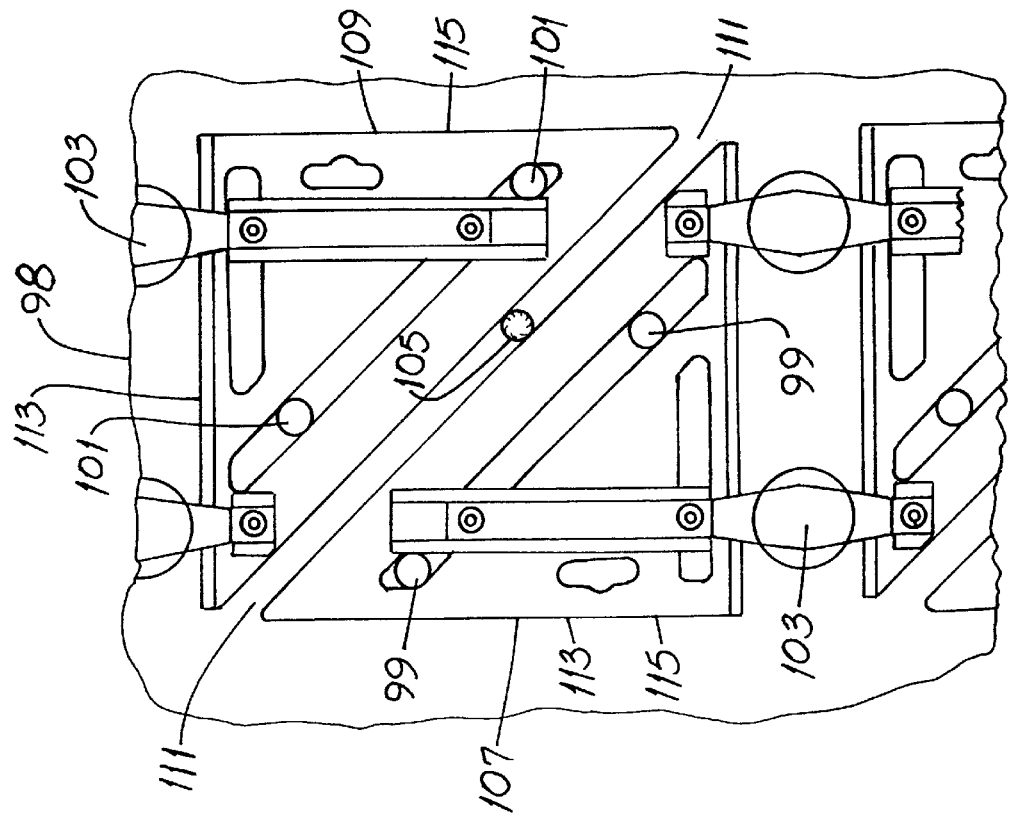
FIG. 9 is a top plan view of a "setup" on the machining center of FIG. 8, such setup being used to perform final machining to yield two exemplary rafter squares.

Referring also to FIG. 9, each product 17 is placed on the machining table 98 in a manner such that other locating pins 99, 101 extend into holes 55b, 55c, respectively, in the same fashion as described above. After such placement, hydraulic clamping mechanisms 103 move downwardly (away from the viewer of FIG. 9) and clamp the products 17 in position. A highly preferred arrangement clamps four products 17 on the table 98 at one time.

It is to be appreciated that when an intermediate product 17 is so placed, it has not yet been divided to form two tools 10. It is also to be appreciated that mechanisms 103 are discretionary as is the number of products 17 clamped at one time. Other types of clamping devices, e.g., mechanical, can be used to clamp one or more products 17.

For the following aspects of the new method, the hole 73b is referred to as a tool-receiving hole. The product 17 is then divided into two semifinished components 107, 109 by moving a cutting tool 105, e.g., a milling tool, along the tool-receiving hole 73b and, particularly, along the axis 110. To divide a product 17 into two semi-finished components 107, 109 the length of the tool-receiving hole 73b is extended by milling away material at the hole ends until the hole "breaks out" at the locations 111 and intersects the perimeter 113.

When the method is used to make rafter squares 10a, the tool-receiving hole 73b is angled with respect to the long axis 31. A preferred included angle is 45°.

The components 107, 109 are then finish-machined using the tool 105, thereby making two rafter squares 10a from each third intermediate product 17 placed on the table 98. In a specific arrangement, four of the third intermediate products 17 are placed on the table 98 and finished. Therefore, one "setup" yields eight ready-to-sell rafter squares 10a. Finish-machining includes machining at least one edge 115 making up the perimeter 113 of each of the intermediate products 17. (When the starting material is a commercially-available elongate strip 29 as described above, the edges 87 are smooth, regular and quite acceptable for a finished, ready-to-sell tool 10a without further machining.)

It is to be appreciated that depending upon the particular type and configuration of builder's tool 10 being made by the new method, the first and second sets of holes (holes 55a–55d and holes 73a–73c, respectively) may be formed sequentially as described in detail above or may be formed simultaneously. In the exemplary rafter square 10a, the sizes, shapes and relative locations of the holes 55a–55d and holes 73*b*–73*c* and the consequent sizes and shapes of the die buttons and punching tools 69, 71 used to make such holes substantially dictate that the sets of holes be made in sequence.

However, if the sets of holes 55*a*–55*d* and holes 73*a*–73*c* involved smaller holes spaced more widely apart, it is likely that the resulting smaller sizes and shapes of the die buttons and punching tools 69, -1 would permit all such buttons and tools 69, 71 to be used at the first work station 41. In such eventuality, all of the first and second sets of holes can be formed simultaneously.

As used herein, the terms "first intermediate product," "second intermediate product" and "third intermediate product" refer to a segment 11 on which certain operations have been performed. For example, a first intermediate product 13 is a segment in which holes 55*a*–55*d* the first set of holes, has been formed.

While the principles of the invention have been shown and described in connection with specific embodiments, it is to be understood clearly that such embodiments are by way of example and are not limiting.

What is claimed:

1. A method for making a builder's tool including:
   severing a segment from a strip of material;
   forming a plurality of holes in the segment;
   marking the segment with dimensional indicia;
   dividing the segment into two semi-finished components; and
   finishing the components, thereby making two of the tools.

2. The method of claim 1 wherein the forming step includes forming, in sequence, first and second sets of holes.

3. The method of claim 2 wherein the second set of holes includes a tool-receiving hole and the dividing step includes moving a cutting tool along the tool-receiving hole.

4. The method of claim 3 wherein the strip extends along a long axis, the tool-receiving hole is angled with respect to the long axis and the tools are rafter squares.

5. The method of claim 1 wherein:
   the marking step includes stamping the segment with lines and numerals representing angular and linear units of measure; and
   the dividing step includes moving a cutting tool along an axis.

6. The method of claim 2 wherein each of the semi-finished components has a perimeter edge and:
   the dividing step includes moving a cutting tool along an axis; and
   the finishing step includes machining the perimeter edge of each of the semi-finished components.

7. The method of claim 1 wherein the segment has a reference surface and the forming step is preceded by the step of aligning the reference surface with respect to a stationary reference.

8. The method of claim 7 wherein one of the holes is a first hole and the marking step is preceded by the step of inserting a first pair of locating pins into the first hole, thereby maintaining alignment of the reference surface with respect to the reference.

9. The method of claim 8 wherein another one of the holes is a second hole and the inserting step includes inserting a second pair of locating pins into the second hole.

10. The method of claim 9 wherein:
    the plurality of holes includes a tool-receiving hole extending along a hole axis;
    the first pair of locating pins defines a first pin axis;
    the second pair of locating pins defines a second pin axis; and
    the pin axes are spaced from the hole axis.

11. The method of claim 10 wherein the pin axes are parallel to the hole axis.

12. The method of claim 1 wherein the severing, forming and marking steps are carried out on a press and the dividing and finishing steps are carried out on a machining center away from the press.

* * * * *